2,962,123

TREATMENT OF HYDROGEN OR GASEOUS MIXTURES CONTAINING HYDROGEN

Alan Sydney Darling, Northwood, England, assignor to Johnson, Matthey & Company Limited, London, England, a British company No Drawing. Filed May 8, 1958, Ser. No. 733,836

Claims priority, application Great Britain May 17, 1957

5 Claims. (Cl. 183—115)

This invention relates generally to processes comprising or involving the separation of mixtures of gases into their constituent elements and is more particularly concerned with the separation of hydrogen from gaseous mixtures containing hydrogen or with the purification of hydrogen gas.

It is well-known that if a gaseous mixture containing hydrogen be brought into contact with palladium, the latter will act as a filter allowing the hydrogen to pass through it whilst preventing the passage of the other constituents of the gas mixture and this property of palladium is made use of to purify hydrogen or to separate it from mixtures with other gases.

In carrying out the procedure in practice, hydrogen to be purified or a gas mixture containing hydrogen is brought into contact with one surface of a heated palladium diffusion element in the form of either a membrane or tube, pure hydrogen diffusing through the membrane or the tube and being collected as required.

It has been found, however, that palladium diffusion membranes or diffusion tubes are liable to crack or pinhole in service due to distortion and be rendered unsuitable for further use after an operating life of as little as seven hours.

An object of this invention is to overcome the above disadvantages in the use of palladium diffusion units and to increase the operating life thereof.

Another object of the invention is to prevent or reduce to a minimum the liability of palladium diffusion membrane or tube elements to crack or distort when used for the separation of hydrogen from gaseous mixtures containing hydrogen or for the purification of hydrogen gas.

A further object of the invention is to provide a method of operating a hydrogen diffusion unit which is efficient and ensures a longer operating life of the said unit than has heretofore been practicable.

Another object of the invention is to provide a novel method of separating hydrogen from a gaseous mixture containing hydrogen or of purifying hydrogen gas which is efficient and less costly than prior methods in that the operating life of the diffusion unit is prolonged and its replacement consequently rendered less frequent than was the case heretofore.

It has long been recognised that pure palladium at room temperature has a lattice parameter of 3.883 A.U. and dissolves large quantities of hydrogen, the solubility decreasing as the temperature rises. This results in a considerable increase of lattice parameter and the formation of two distinct phases. The alpha phase is formed by a gradual expansion of the lattice parameter of pure palladium from 3.883 to 3.894 A.U. At hydrogen concentrations higher than relative volumes of 30, the beta phase having a parameter of 4.018 A.U. begins to form, both phases being of the normal face-centred cubic type. The miscibility gap between the alpha and beta phases closes at a critical temperature, which is below 310° C. and depends on the pressure. Above this temperature the beta phase begins to transform into alpha. Conversely, upon cooling, in a hydrogen-containing atmosphere, the hydrogen will be absorbed and the alpha phase will begin to transform into the beta phase, at a temperature somewhat lower than this critical temperature.

Investigations carried out by me with the object of endeavouring to ascertain the cause of the failure of palladium diffusion membranes or tubes due to cracking or distortion led to the conclusion that this failure was probably associated with the alpha-beta transformation which occurs in the hydrogen palladium system at temperatures below the critical temperature above referred to, as, at a temperature of 100° C., the volume of the beta phase was found to be approximately 10% higher than that of the alpha phase from which it forms, and consequently the transformation which occurs in cooling must result in progressive distortion, with consequent work-hardening.

Since, in use, palladium diffusion membrane or tube elements are usually subjected, during their operating life, to repeated cycles of heating and cooling between room temperature and an operating temperature of 700° C. and more, it is obvious that repeated phase transformations will occur from the alpha to the beta phase and it was felt that the accumulative damage resulting from this repeated transformation must account for the failure of palladium diffusion units.

Further experiments proved the correctness of this hypothesis and I have now found that the disadvantages hitherto associated with the use of palladium diffusion elements can be overcome provided the membrane or tube elements are constantly maintained at a temperature above that at which the alpha beta transformation occurs.

A particular object of my invention, therefore, is to prevent, or substantially reduce, the cracking or distortion of the palladium diffusion elements of diffusion units used for the separation of hydrogen from gaseous mixtures containing hydrogen or for the purification of hydrogen gas by causing the gaseous mixture or the hydrogen gas to contact the heated element and pure hydrogen to diffuse therethrough by constantly maintaining the said palladium diffusion element at a temperature which is above that at which transformation of the alpha phase of the palladium hydrogen system to the beta phase will take place and a stable beta phase be formed.

It is to be understood that the expression "diffusion element" as used herein and in the claims is intended to have the meaning assigned to it above and to comprise either a diffusion membrane with which the gas is contacted or a diffusion tube through which the gas is passed.

The invention thus provides a method of operating a hydrogen diffusion unit or of separting hydrogen from a gaseous mixture containing hydrogen or of purifying hydrogen gas by the use of a hydrogen diffusion unit having a palladium diffusion element in the form of a membrane or tube over or through which, in the heated state, the gaseous mixture or hydrogen gas is passed to cause pure hydrogen to diffuse through the palladium metal, which method includes the steps of heating the palladium diffusion element to, and constantly maintaining it at, a temperature which is above that at which transformation of the alpha phase of the palladium hydrogen system to the beta phase will take place and a stable beta phase be formed.

Whilst the critical alpha-beta transformation temperature will vary in dependence on the pressure of the gas and may vary between about 100° C. and 250° C., it will be found advantageous, in carrying out the invention in practice, always to operate the diffusion unit at a temperature above 310° C., as the beta phase is unstable above this temperature even at the highest gas pressure.

I have found that the most advantageous results are obtained by cycling the temperature of the unit between temperatures of 350° C. and 700° C. and never allowing it to drop below 350° C. even when the unit is not in operation, as by this procedure failure of the palladium diffusion element due to distortion and cracking will not occur, even if some hydrogen should still be present in the unit. It may, however, be found advisable to maintain a reducing atmosphere around the heated element, even when the latter is not in service.

As will be readily appreciated by proceeding in accordance with the method of the invention, the active life of palladium diffusion units will be considerably prolonged, as the cracking or distortion of the palladium membrane or tube hitherto associated with the use of such units will be found to be substantially eliminated.

What I claim is:

1. Process for the separation of hydrogen from a gas mixture thereof with another gas which comprises heating a palladium diffusion element to a diffusion promoting temperature which is above the transformation temperature of the alpha phase of the palladium-hydrogen system to the beta phase, delivering said gas mixture into contact with said element and withdrawing the resulting diffused hydrogen from said element at said diffusion promoting temperature, interrupting the delivery of said gas mixture to and the withdrawal of diffused hydrogen from said element while maintaining said element at a temperature above said transformation temperature and repeating this sequence of operations.

2. Process for the separation of hydrogen as defined in claim 1 in which said diffusion promoting temperature is substantially higher than the temperature at which said element is maintained while the delivery of said gas mixture thereto and the withdrawal of diffused hydrogen therefrom is interrupted.

3. Process for the separation of hydrogen as defined in claim 1 in which said temperature at which said element is maintained while the delivery of said gas mixture thereto and the withdrawal of diffused hydrogen therefrom is interrupted is above 310° C.

4. Process for the separation of hydrogen as defined in claim 1 in which said diffusion temperature is about 700° C. and said temperature at which said element is maintained while the delivery of gas mixture thereto and the withdrawal of diffused hydrogen therefrom is interrupted is about 350° C.

5. Process for the separation of hydrogen as defined in claim 1 in which said element is maintained in a reducing atmosphere while the delivery of gas mixture thereto and the withdrawal of diffused hydrogen therefrom is interrupted.

References Cited in the file of this patent

UNITED STATES PATENTS 2,536,610  King et al. _____ Jan. 2, 1951

FOREIGN PATENTS 308,792  Great Britain _____ Aug. 11, 1930